(12) United States Patent
Miermont et al.

(10) Patent No.: US 8,621,257 B2
(45) Date of Patent: Dec. 31, 2013

(54) DEVICE FOR POWERING AN ELECTRONIC CIRCUIT, IN PARTICULAR A DIGITAL CIRCUIT, AND ASSOCIATED METHOD

(75) Inventors: Sylvain Miermont, Grenoble (FR); Edith Beigne, Meaudre (FR); Bettina Rebaud, Grenoble (FR); Pascal Vivet, Saint Paul de Varces (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 199 days.

(21) Appl. No.: 12/921,103

(22) PCT Filed: Mar. 6, 2009

(86) PCT No.: PCT/FR2009/050369
§ 371 (c)(1),
(2), (4) Date: Sep. 3, 2010

(87) PCT Pub. No.: WO2009/115744
PCT Pub. Date: Sep. 24, 2009

(65) Prior Publication Data
US 2011/0029795 A1    Feb. 3, 2011

(30) Foreign Application Priority Data
Mar. 6, 2008    (FR) ...................... 08 51471

(51) Int. Cl.
*G06F 1/32*    (2006.01)
(52) U.S. Cl.
CPC .............. *G06F 1/324* (2013.01); *G06F 1/3296* (2013.01)
USPC ......................................... 713/330; 713/322

(58) Field of Classification Search
USPC ......................................................... 713/322
See application file for complete search history.

(56) References Cited

U.S. PATENT DOCUMENTS

| 6,023,641 | A | 2/2000 | Thompson |
| 6,501,304 | B1 | 12/2002 | Boerstler et al. |
| 6,845,456 | B1 * | 1/2005 | Menezes et al. ............. 713/320 |
| 7,149,910 | B2 * | 12/2006 | Ishibashi et al. ............. 713/322 |

(Continued)

FOREIGN PATENT DOCUMENTS

| JP | 11-118845 A | 4/1999 |
| JP | 2003-006179 A | 1/2003 |

(Continued)

OTHER PUBLICATIONS

International Search Report Dated Oct. 13, 2009 (3 pgs).

(Continued)

*Primary Examiner* — Ryan Stiglic
(74) *Attorney, Agent, or Firm* — Brinks Gilson & Lione (57) ABSTRACT

A device for powering an electronic circuit that applies at least a first voltage or a second voltage, different from the first voltage, to the electronic circuit. The device includes a performance monitor that receives an item of information defining a constraint and determines a first duration and a second duration, such that the operation of the electronic circuit at a first frequency associated with the first voltage for the first duration, and at a second frequency associated with the second voltage for the second duration, complies with the constraint. The device applies the first voltage and the first frequency to the circuit for the first duration and the second voltage and the second frequency for the second duration.

19 Claims, 5 Drawing Sheets

(56) References Cited

U.S. PATENT DOCUMENTS

| | | | |
|---|---|---|---|
| 7,346,791 B2 * | 3/2008 | Kato et al. | 713/322 |
| 7,386,737 B2 * | 6/2008 | Finkelstein et al. | 713/300 |
| 7,444,528 B2 * | 10/2008 | Narendra et al. | 713/320 |
| 7,689,845 B2 * | 3/2010 | Narendra et al. | 713/320 |
| 7,770,034 B2 * | 8/2010 | Nanja | 713/300 |
| 7,772,909 B2 * | 8/2010 | Haid et al. | 327/291 |
| 8,006,113 B2 * | 8/2011 | Rozen et al. | 713/340 |
| 8,127,161 B2 * | 2/2012 | Murakami | 713/322 |
| 8,190,939 B2 * | 5/2012 | Fields et al. | 713/324 |
| 8,239,694 B2 * | 8/2012 | Saha et al. | 713/300 |
| 2002/0194513 A1 | 12/2002 | Ishibashi et al. | |
| 2003/0226049 A1 | 12/2003 | Mantani | |
| 2004/0193935 A1 * | 9/2004 | Kato et al. | 713/500 |
| 2005/0132238 A1 * | 6/2005 | Nanja | 713/300 |
| 2006/0066376 A1 | 3/2006 | Narendra et al. | |
| 2006/0095798 A1 * | 5/2006 | Finkelstein et al. | 713/300 |
| 2006/0123252 A1 | 6/2006 | Vaidya et al. | |
| 2007/0016815 A1 * | 1/2007 | Cooper et al. | 713/322 |
| 2007/0130485 A1 * | 6/2007 | Narendra et al. | 713/320 |
| 2009/0177903 A1 * | 7/2009 | Rozen et al. | 713/322 |
| 2010/0023790 A1 * | 1/2010 | Cooper et al. | 713/322 |
| 2010/0049997 A1 * | 2/2010 | Tu | 713/300 |
| 2010/0145895 A1 * | 6/2010 | Narendra et al. | 706/12 |
| 2010/0162023 A1 * | 6/2010 | Rotem et al. | 713/340 |
| 2010/0169701 A1 * | 7/2010 | Tu | 713/600 |
| 2010/0287393 A1 * | 11/2010 | Burchard et al. | 713/322 |
| 2010/0296238 A1 * | 11/2010 | Mowry et al. | 361/679.53 |
| 2011/0113271 A1 * | 5/2011 | Bourdelles | 713/320 |
| 2012/0023345 A1 * | 1/2012 | Naffziger et al. | 713/320 |

FOREIGN PATENT DOCUMENTS

| | | |
|---|---|---|
| JP | 2003-140767 A | 5/2003 |
| WO | WO 02/21245 A1 | 3/2002 |
| WO | WO 2004/100370 A2 | 11/2004 |

OTHER PUBLICATIONS

Burd T. et al., "*A Dynamic Voltage Scaled Microprocessor System*"—IEEE Journal of Solid-State Circuits, vol. 35, No. 11, Nov. 1, 2000.

Dhar S. et al., "*Closed-Loop Adaptive Voltage Scaling Controller for Standard-Cell ASICs*"—Proceedings of ISLPED, Aug. 2002.

Ketchen B.M. et al., "*Product-Representative 'at Speed' Test Structures for CMOS Characterization*"—IBM Journal of Research & Development, vol. 50, No. 4/5. Jul. 2005.

Miermont S. et al., "*A Power Supply Selector for Energy-and Area-Efficient Local Dynamic Voltage Scaling*"—Proceedings of PATMOS, Sep. 2007.

Nakai, M. et al., "*Dynamic Voltage and Frequency Management for a Low-Power Embedded Microprocessor*"—IEEE Journal JSSC, vol. 40, No. 1, Jan. 2005.

Nielsen L. S. et al., "*Low-Power Operation Using Self-Timed Circuits and Adaptive Scaling of the Supply Voltage*"—IEEE Journal VLSI, vol. 2, No. 4, Dec. 1994.

Onizuka K. et al., "*VDD-Hopping Accelerator for On-Chip Power Supplies Achieving Nano-Second Order Transient Time*"—Proceedings of the ASSCC, Nov. 2005.

Pennanen, et al., "*Next Generation SoC Power Management*"—Journal Electronics Product Design, Mar. 2007.

Seki T. et al., "*Dynamic Voltage and Frequency Management for a Low-Power Embedded Microprocessor*—IEICE Transactions on Electronics, vol. E88-C, No. 4, Apr. 1, 2005—pp. 520-527.

Office Action from counterpart Japanese Application No. 2010-549185, dated Sep. 11, 2012, 2 pages.

\* cited by examiner

DEVICE FOR POWERING AN ELECTRONIC CIRCUIT, IN PARTICULAR A DIGITAL CIRCUIT, AND ASSOCIATED METHOD

PRIORITY CLAIM

This application is a nationalization under 35 U.S.C. 371 of PCT Application No. PCT/FR2009/050369, filed Mar. 6, 2009, which claims priority to French Patent Application No. 0851471, filed Mar. 6, 2008, and incorporated by reference herein.

TECHNICAL FIELD

The present invention relates to a device for powering an electronic circuit, in particular a digital circuit, and an associated method.

BACKGROUND

In order to optimize the supply of power to an electronic circuit (in particular in the case of digital circuits), it has been proposed to adapt the supply of power to the performance required at a given time in the operation of the electronic circuit.

The current design of numerous electronic circuits, in particular digital electronic circuits (and notably those produced in CMOS technology), is such that the energy consumed to perform a given set of operations increases with the power supply voltage used, which is imposed by the frequency at which the circuit is required to operate.

It has thus appeared possible to optimize power consumption by adapting the supply voltage to a level as low as possible but sufficient to ensure reliable operation at the required level of performance (i.e. at the required clock frequency in the case of a synchronous circuit).

The paper "*Low-Power Operation Using Self-Timed Circuits and Adaptive Scaling of the Supply Voltage*" by L. S. Nielsen et al. in the journal IEEE VLSI volume 2, number 4, December 1994, thus introduces the concept of adaptive voltage scaling in the context of asynchronous logic systems.

Adapting the supply voltage to the operating frequency of synchronous digital circuits has also been proposed, notably in the papers "*A Dynamic Voltage Scaled Microprocessor System*", by T. D. Burd et al., in the journal IEEE JSSC volume 35, number 11, November 2000, and "*Closed-Loop Adaptive Voltage Scaling Controller for Standard-Cell ASICs*", by S. Dhar et al., in proceedings of ISLPED, August 2002.

Other solutions have been proposed more recently in the same line of thinking, notably in the paper "*Dynamic Voltage and Frequency Management for a Low-Power Embedded Microprocessor*", by M. Nakai et al., in the journal IEEE JSSC volume 40, number 1, January 2005, and in the paper "*Next Generation SoC Power Management*", by J. Pennanen et al., in the journal Electronics Product Design, March 2007.

Although these systems make it possible to optimize electrical power consumption by adapting the supply voltage to the performance constraints of the electronic circuit (generally expressed in terms of the operating frequency required by the applications implemented by the electronic circuit), on the other hand, because of their design, they require a power supply module able to deliver a voltage variable over a continuous range of values throughout operation, generally implemented in the form of a DC-DC converter.

The presence of such a module causes problems regardless of the technology envisaged: the use of external choppers is naturally not suited to the integration of all the components in an integrated circuit; because of the presence of numerous passive components, the use of internal choppers is very costly (in terms of substrate area or because of the processes used); as for linear converters, they suffer from low efficiency.

SUMMARY

In the above context, the invention proposes a device for powering an electronic circuit able to apply at least a first voltage or a second voltage different from the first voltage to the electronic circuit, characterized in that it comprises:

means for determining a first frequency associated with the first voltage as a function of at least one operating parameter of the circuit;

means for receiving information defining a constraint;

means for determining a first duration and a second duration which are such that the operation of the circuit at the first frequency for the first duration and at a second frequency associated with the second voltage for the second duration complies with said constraint;

application means able to apply to the circuit the first voltage and the first frequency for the first duration and the second voltage and the second frequency for the second duration.

Thus the mean operating point of the circuit may be adjusted according to the relative weighting of the first duration and the second duration, within a continuous set of operating points, in order to be adapted optimally to the constraint received, at the same time as using a discrete number (generally two) available voltages and taking account of the operating conditions of the circuit.

It may also be provided that the means for determining the first frequency are able to determine the second frequency as a function of at least one operating parameter of the circuit, in order also to use a second frequency optimized in the light of the current operating conditions.

The above means may use means for measuring said parameter in the electronic circuit, examples of which are given in the description given hereinafter.

For example, the information is a target frequency and the determination means are adapted to determine the first duration and the second duration so that the circuit operates at a mean effective frequency higher than the target frequency.

In one embodiment that may be envisaged, the application means are able to execute periodically a period (i.e. a cycle) formed successively of the application of the first voltage and the first frequency and application of the second voltage and the second frequency. The cyclic ratio (i.e. the relative duration of application of the first frequency and the first voltage compared to the total duration of the period) is then directly linked to the mean effective frequency, as explained hereinafter.

In practice, the means for determining the first duration and the second duration may be able to determine a ratio between the first duration and the second duration as a function at least of the first frequency (directly linked to the cyclic ratio just mentioned). This influences the mean effective frequency.

For example, said operating parameter represents an instantaneous operating condition of the circuit, which makes it possible to update the first and second durations (for example their ratio linked to the cyclic ratio) regularly and dynamically.

The means for determining the first frequency may be able to determine the second frequency as a function of at least one instantaneous operating condition of the circuit.

It may then be provided that the means for determining the first duration and the second duration are able to determine a ratio between the first duration and the second duration as a function of the first frequency and the second frequency (directly linked to the cyclic ratio), and dynamically, as indicated above.

In one embodiment that may be envisaged, the application means comprise a frequency selector receiving a first clock signal having the first frequency and a second clock signal having the second frequency and applying to the electronic circuit the first clock signal during the first duration and the second clock signal during the second duration.

In another embodiment that may be envisaged, the application means comprise a clock generator able to generate and to apply to the electronic circuit a first clock having the first frequency during the first duration and a second clock having the second frequency during the second duration.

The application means may comprise a voltage selector receiving the first voltage and the second voltage and applying to the electronic circuit the first voltage during the first duration and the second voltage during the second duration.

In one possible embodiment, the voltage selector comprises:

means for applying to the electronic circuit a voltage variable from a value equal to the first voltage to a value equal to the second voltage;

means for selecting application of the second voltage to the electronic circuit when the variable voltage reaches the second voltage.

The voltage selector may then comprise:

means for applying the variable voltage to the electronic circuit when the second voltage is applied;

means for eliminating the application of the second voltage when the variable voltage is applied;

means for commanding the variable voltage from a value equal to the second voltage to a value equal to the first voltage.

In this case the variable voltage is applied only during transition phases between the first voltage and the second voltage (phases of short duration compared to the total duration of operation); this variable voltage may then be generated by means of a linear converter, for example, without notable consequences for the efficiency over the total duration of operation.

The constraint is temporal, for example (and in this case expressed in the form of a time or a frequency), although other possibilities may be envisaged, such as a mean power consumption constraint.

The electronic circuit is in practice often a digital circuit, for example implemented in CMOS technology.

The invention also proposes, in a manner that is novel in itself, a device for powering an electronic circuit able to apply to the electronic circuit at least a first voltage or a second voltage different from the first voltage, characterized in that it comprises:

means for receiving information defining a constraint;

means for determining a first number of clock cycles and a second number of clock cycles such that the operation of the circuit at a first frequency associated with the first voltage during the first number of clock cycles and at a second frequency associated with the second voltage during the second number of clock cycles complies with said constraint;

application means able to apply the first voltage and the first frequency to the circuit during the first number of clock cycles and the second voltage and the second frequency during the second number of clock cycles.

There may further be provided in this case synchronization means able to synchronize (the start of) the application of the first voltage and (the start of) a process to be effected with said constraint.

The total number of clock cycles necessary for the process is then predetermined, for example; the constraint may in practice be the time in which it is required to effect the process.

The optional features referred to above also apply in this context. There may further be provision here for the frequencies mentioned above to be predetermined (for example when designing the system or during a phase of calibrating the circuit) in order to ensure reliable operation thereof taking account of variations and drift that may be envisaged, and where applicable stored in the determination means, still with the aim of minimizing the energy consumed by the circuit.

The invention further proposes a method of powering an electronic circuit by means of at least a first voltage or a second voltage different from the first voltage, characterized in that it comprises the following steps:

determining a first frequency associated with the first voltage as a function of at least one operating parameter of the circuit;

receiving information defining a constraint;

determining a first duration and a second duration such that operation of the circuit at the first frequency during the first duration and at a second frequency associated with the second voltage during the second duration complies with said constraint;

applying to the circuit the first voltage and the first frequency during the first duration and the second voltage and the second frequency during the second duration.

The following steps may further be envisaged, to vary the powering of the circuit dynamically:

periodically measuring the operating parameter;

periodically determining the first frequency as a function of the measured parameter.

It may thus be provided periodically determining a ratio between the first duration and the second duration as a function of the first frequency determined as a function of the measured parameter.

BRIEF DESCRIPTION OF DRAWING

Other features and advantages of the invention will become more apparent in the light of the following description given with reference to the appended drawings, in which.

DETAILED DESCRIPTION

Figure 1:
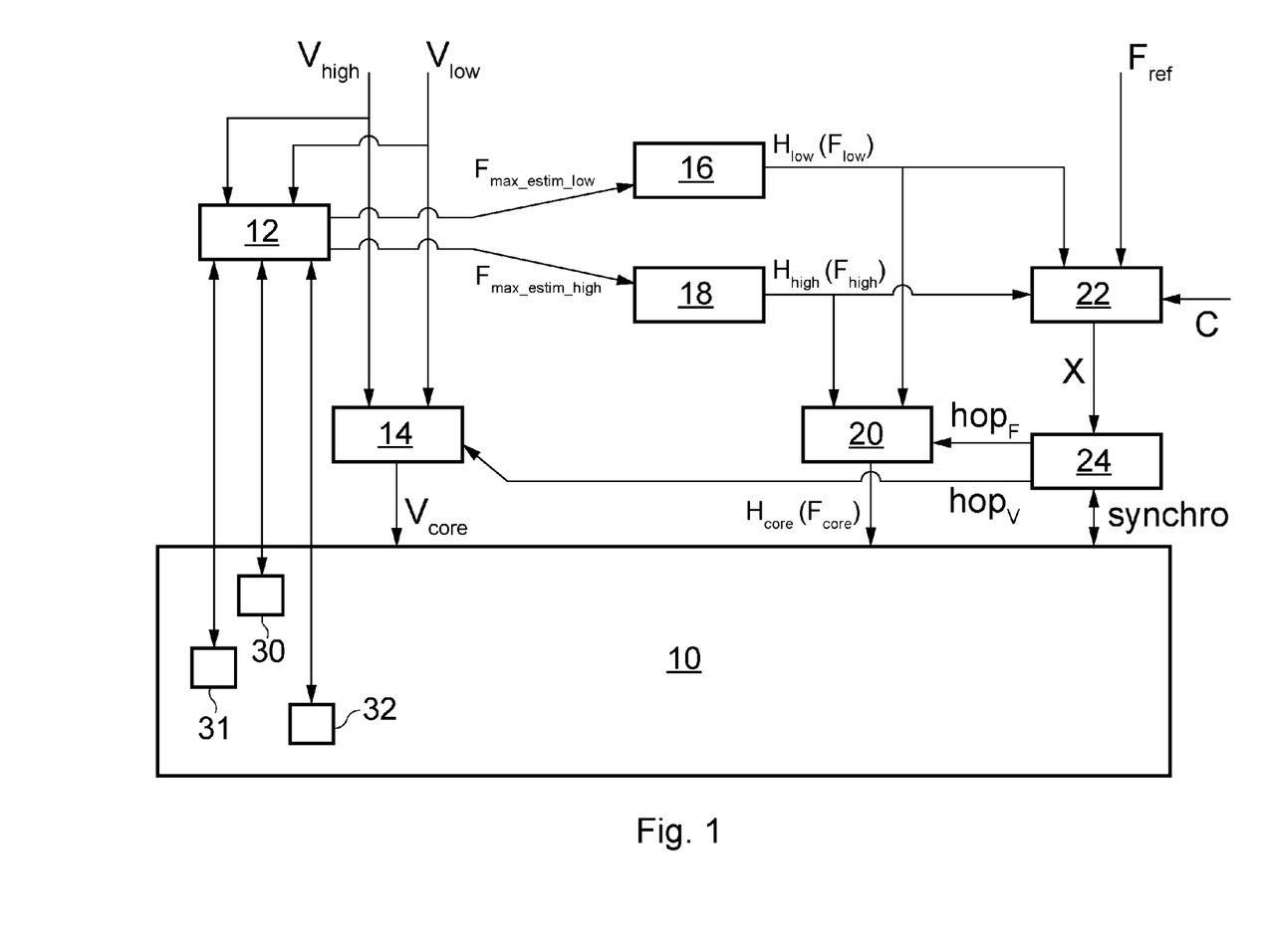
FIG. 1 represents the main components of a system conforming to the teaching of the invention.

FIG. 1 represents the components of a device for powering a functional core 10, for example a synchronous electronic circuit implemented in CMOS digital logic.

The components of this device described hereinafter may be combined in the same integrated circuit as the functional core 10, and consequently implemented in CMOS technology. Alternatively, some or all of these components could be produced in the form of a module external to the functional core 10.

Moreover, the power supply device is described hereinafter in the form of functional components. Nevertheless, in some embodiments a plurality of functions could be implemented by the same component.

It is considered here that any synchronous digital circuit is capable of operating at a maximum frequency $F_{real\_max}$, that this frequency cannot be measured directly, and that it varies in time according to intrinsic and extrinsic factors. The intrinsic factors are the variability of the fabrication process and ageing; the extrinsic factors are supply voltage and temperature.

It is also considered that operating the circuit faster than this frequency causes delay faults that lead to corruption of the operation of the circuit.

The power supply device from FIG. 1 comprises an adaptation controller 12 which receives on the one hand a high voltage $V_{high}$ and a low voltage $V_{low}$ and on the other hand drives probes 30, 31, 32 physically situated within the core 10 in order to measure operating parameters thereof.

Communication between the probes 30, 31, 32 and the adaptation controller 12 (notably to drive the probes and to feed the value of the monitored parameters back to the controller) can be effected by any appropriate means, for example using analogue or digital signals or any combination of those signal types.

The adaptation controller 12 thus drives the probes 30, 31, 32 and collects the values of the operating parameters measured by those probes, notably with the aim of comparing those values with calibration values stored for example in a non-volatile memory associated with the adaptation controller or with values produced by reference sources (typically reference frequency, voltage or current).

On the basis of the measured values, and where applicable the comparisons effected, the adaptation controller then estimates for each of the supply voltages envisaged in the device (in particular, for the high voltage $V_{high}$ and the low voltage $V_{low}$ here) what maximum frequency $F_{practical\_max}$ may be used in practice without degrading reliable operation of the system.

This estimation of a frequency associated with each supply voltage value may be performed using known techniques of determining voltage-frequency pairs enabling reliable operation of the system as described in the paper, for example by simulation or by calibration by means of a speed test carried out after fabrication of the circuit. Note however that here there is provision for determining an operating frequency for each available voltage supply rather than adaptation of the voltage to a required frequency.

In practice, estimation may be based on a pessimistic estimate of the maximum frequency $F_{real\_max}$ mentioned above obtained by simulation, followed by determining by means of measurements if the instantaneous operating conditions are favorable or not, and, finally, calculating for each voltage supply a frequency $F_{estim\_max}$ as close to an optimistic estimate of the frequency $F_{real\_max}$ that these operating conditions allow taking into account the relative inaccuracy of the measurements.

Moreover, to compensate the evolution in time of the sources of variation, the estimation of the maximum practical frequencies $F_{estim\_max}$ associated with each supply voltage must be carried out at regular intervals, with a period depending on the time constants of the variations to be compensated.

On the basis of practical maximum frequencies $F_{estim\_max}$ determined as indicated above, the adaptation controller 12 commands clock generators 16, 18 (to be precise a first clock generator 16 associated with the low voltage $V_{low}$ and a second clock generator 18 associated with the high voltage $V_{high}$ here) in order for each of the latter to provide an output clock signal (respectively $H_{low}$ and $H_{high}$ here) having the frequency determined by the adaptation controller 12.

A performance controller 22 receives the clock signals $H_{low}$, $H_{high}$ and determines the respective frequency ($F_{low}$, $F_{high}$) of each of these signals, for example using a reference frequency signal $F_{ref}$. The performance controller 22 could alternatively also receive the frequency values associated with each supply voltage directly from the adaptation controller 12. The solution proposed in FIG. 1 nevertheless enables the performance controller 22 to operate on the clock signals actually generated, as applied to the core 10 as described hereinafter.

The performance controller also receives information C representing a performance constraint, for example a frequency or time constraint, to be complied with by the power supply device. This constraint is determined by the application (in the "software" sense) implemented by the core 10, for example, notably as a function of the requirements of that application.

As a function of the measured frequencies $F_{low}$ and $F_{high}$ of the signals $H_{low}$ and $H_{high}$ and the constraint information C, the performance controller 22 determines the respective durations of application of the two supply voltages, for example here in the form of the ratio X between the time of application of the high voltage $V_{high}$ and the cumulative time of application of the two voltages, making it possible to comply optimally with the constraint defined in the information C.

If C is a constraint $F_{target}$ expressed in frequency form, the system may be dimensioned so that this frequency constraint $F_{target}$ is between the values of $F_{low}$ and $F_{high}$ that may be envisaged, which makes it possible to obtain a ratio X between 0 and 1.

The performance controller 22 may also impose operation at the high voltage $V_{high}$ and at the corresponding frequency $F_{high}$ if the constraint C will not be reached despite continuous operation at the latter frequency $F_{high}$ (i.e. a ratio X=1) and that the constraint therefore cannot be complied with (for example if $F_{target} F_{high}$), in this case the device may indicate to the entity sending the constraint C that the constraint cannot be complied with, the entity sending the constraint being able either to modify the operation of the core 10 in order to reduce the constraint C or to command an increase in the voltage $V_{high}$ in systems where this voltage is adjustable.

If the constraint C is less than the frequency $F_{low}$ associated with the low voltage $V_{low}$, it is furthermore possible to operate continuously at the low voltage $V_{low}$, and the associated frequency $F_{low}$ (X=0) or to command the clock generator 16 to reduce the frequency (whilst retaining the low voltage $V_{low}$, which does not cause any operating problems) or to switch the power supply into a standby state for part of the time, enabling this constraint C lower that $F_{low}$ to be complied with.

The ratio X determined by the performance controller 22 is transmitted to a transition sequencer 24 that drives a voltage selector 14 and a frequency selector 20 (respectively by means of a voltage command $hop_e$ and a frequency command $hop_F$) so that the selectors 14, 20 respectively apply the high voltage $V_{high}$ and the associated clock signal $H_{high}$ for the duration defined by the performance controller 22 (here a proportion X of the time) and the low voltage $V_{low}$ and the associated clock signal $H_{low}$ for another duration also defined by the performance controller 22, here the remaining time (i.e. a proportion 1−X of the time).

In this context, the transition sequencer 24 ensures in particular that the low voltage $V_{low}$ and the clock signal $H_{high}$ associated with the high voltage $V_{high}$ are never applied simultaneously, in particular during the transition phases, which would be problematic for the operation of the circuit.

The voltage selector 14 receives on the one hand the voltage $V_{high}$ and on the other hand the voltage $V_{low}$ and applies one of these two voltages to the core 10 as a function of the command signal $hop_V$. Similarly, the frequency selector 20 receives the clock signals $H_{low}$ and $H_{high}$ separately and applies one of these clock signals to the core 10 according to the command $hop_F$. In FIG. 1, $V_{core}$ is the voltage applied to the core 10 by the voltage selector 14 and $H_{core}$ is the clock signal at the frequency $F_{core}$ applied to the core 10 by the frequency selector 20.

In the practical implementation chosen for the selectors 14, 20, continuous operation of the core 10 could be retained during transition phases between the two voltage values that have just been indicated or, conversely, the operation of the core 10 could be interrupted during these transitions, for example by means of synchronization information (synchro) exchanged between the core 10 and the transition sequencer 24. In this latter case, the performance controller 22 takes account of the duration of interruption of the operation of the core 10 in determining the various durations of application of each voltage, with the aim of complying with the constraint C.

Accordingly, although it uses the available voltages (only two voltages $V_{high}$ and $V_{low}$ here), the powering device may operate in an optimized manner adapted to a constraint C (which may for its part vary over a continuous range of values) thanks to the variable weighting of the time of use of one voltage supply relative to the other and the resulting variable (and thus adaptable to the constraint) performance.

Figure 2:
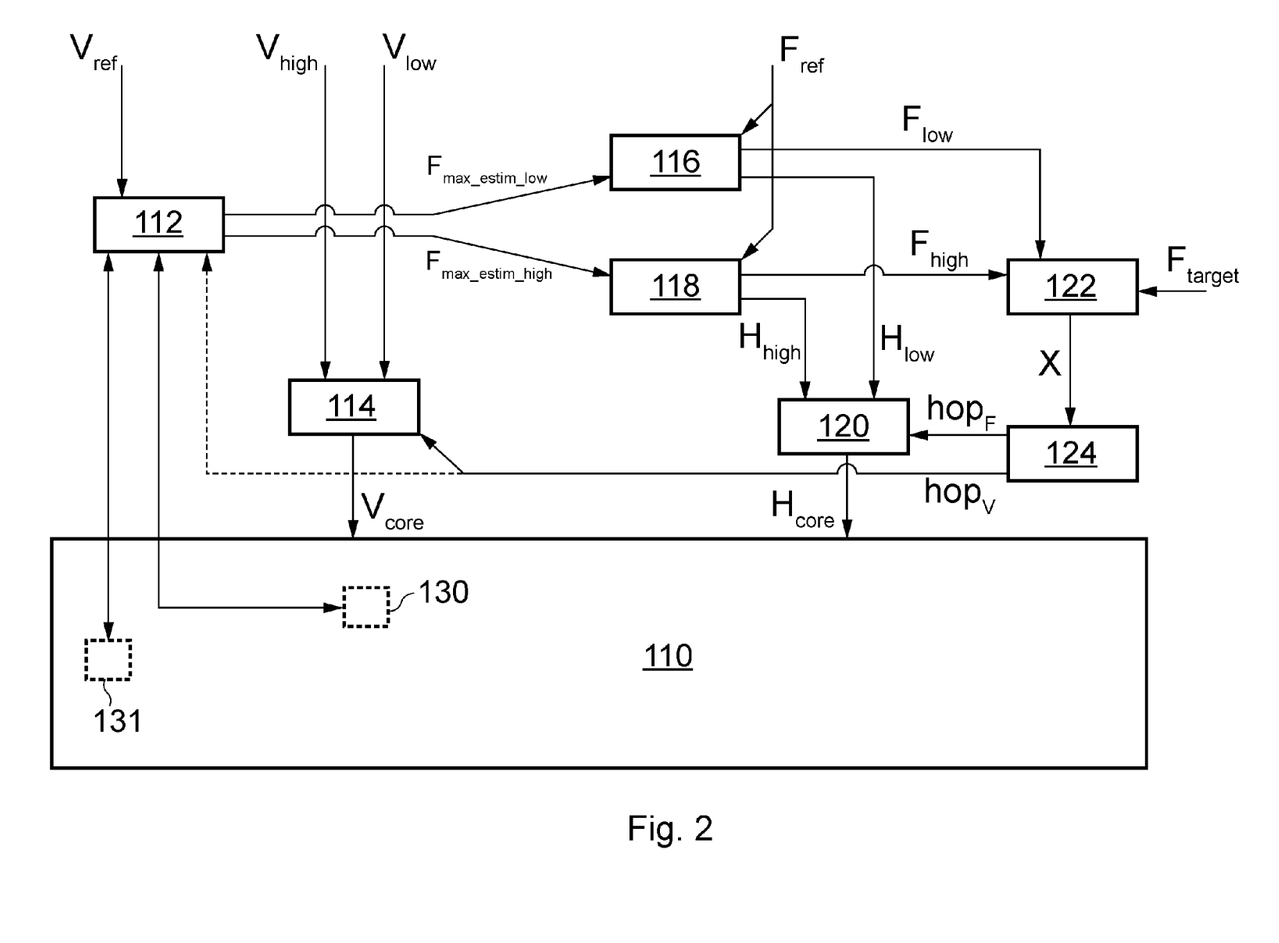
FIG. 2 represents a first example of application of such a system.

FIG. 2 represents an embodiment of the invention in an application in which the constraint to be complied with is expressed in the form of an operating frequency required by the process implemented by the digital core 110.

Each component of FIG. 2 has been assigned a reference number increased by 100 relative to the component having the same function in FIG. 1.

In this embodiment, an adaptation controller 112 drives a voltage probe 130 and a temperature probe 131.

The voltage probe 130 measures the supply voltage actually received by the core 110, in particular allowing for local voltage drops caused by the resistivity of the power supply grid.

The voltage measured by the probe 130 is compared to a reference voltage $V_{ref}$ and can thus be converted in the adaptation controller 112 into a digital value representing this measured voltage.

The temperature probe 131 also makes it possible to obtain digital information representing the value of the measured temperature. To this end, the temperature probe 131 in practice measures the voltage at the terminals of the diode forward-biased by a reference current, for example (the voltage at the terminals of the diode varying as a function of temperature); in this case the measured voltage may equally be converted into the form of digital temperature information in the adaptation controller 112.

The core 110 being subjected to two different supply voltages, as explained in detail hereinafter, the adaptation controller 112 must be able to distinguish between the various power supply phases in order to determine to which required voltage the measured voltage corresponds. To this end, communication may for example be provided between the adaptation controller 112 and the transition sequencer 124 described hereinafter (as represented in dashed line in FIG. 2) or other components holding information on the applied voltage (such as the voltage selector 114 for example). Alternatively, the adaptation controller 112 may determine the supply voltage concerned ($V_{high}$ or $V_{low}$) as a function of the measured voltage and a threshold (equal to $V_{low}$, for example, because the measured voltage will in theory be less than the applied voltage because in particular of the voltage drops referred to above).

The adaptation controller 112 may also consider invalid any measurement during which the measured voltage varies significantly (to avoid the situation in which the measurement is effected during the transition phase between the two supply voltages as described hereinafter).

On the basis of the measured temperature and the measured effective supply voltages (one measured value for each possible supply voltage, here $V_{high}$ and $V_{low}$), the adaptation controller 112 determines the maximum practical frequencies $F_{max\_estim\_high}$ and $F_{max\_estim\_low}$ respectively associated with the high voltage $V_{high}$ and the low voltage $V_{low}$, for example using tables stored in a non-volatile memory associated with the adaptation controller 112 or as a function of formulas determined by the characteristics of the technology used.

In the case of using tables storing the maximum practical frequency values associated with measured voltage-temperature pairs, it is possible to carry out during a phase of starting up the digital circuit tests aiming to determine the maximum reliable operating frequency of the core 110 at room temperature and for a plurality of voltages, with the aim of partially updating the aforementioned table. These tests (generally called "auto-tests") consist for example in verifying correct operation of the core 110 at increasing frequencies in order to retain the highest frequency that achieves reliable operation of the core 110, preferably retaining a margin of uncertainty to combat any drift in the system.

The maximum practical frequencies $F_{max\_estim\_low}$ and $F_{max\_estim\_high}$ determined in this way and respectively associated with the low voltage $V_{low}$ and the high voltage $V_{high}$ are respectively transmitted to a first clock generator 116 and a second clock generator 118.

Each of the clock generators 116, 118 is of the frequency-locked loop (FLL) type, for example, produced by means of a voltage-controlled local oscillator with low jitter and a control loop that slaves the generated frequency to the frequency set point received and to a reference frequency $F_{ref}$ received by each of the clock generators 116, 118.

Each of the clock generators 116, 118 sends a performance controller 122 information representing the frequency currently generated by this clock generator (information designated $F_{low}$ for the clock generator 116 and $F_{high}$ for the clock generator 118).

The clock signals $H_{low}$ and $H_{high}$ respectively generated by the first clock generator 116 and by the second clock generator 118 are applied to the input of a frequency selector 120 the operation of which is described hereinafter.

The performance controller 122 therefore receives information representing the frequencies respectively generated by the first generator 116 and the second generator 118, i.e. respectively associated with the low voltage $V_{low}$ and the high voltage $V_{high}$. The performance controller 122 also receives, for example in the form of digitally coded information, the operating frequency $F_{target}$ required by the process implemented by the core 110 (which in the present application expresses the constraint with which the power supply device must comply).

The ratings of the circuit at the design stage are such that this frequency constraint $F_{target}$ is between the frequencies $F_{low}$ and $F_{high}$ of the clocks $H_{low}$ and $H_{high}$ and the performance controller 122 can thus determine a proportion X (in percent) of the total calculation time such that the mean effective frequency $F_{eff}=X\cdot F_{high}+(1-X)$. The frequency $F_{low}$ must be higher than the target frequency $F_{target}$.

The mean effective frequency $F_{eff}$ obtained by causing the core 110 to operate for a proportion X of the total time at the frequency $F_{high}$ and the rest of the time at the frequency $F_{low}$ is therefore higher than the target and thus makes it possible to comply with the constraint defined thereby.

For example, $F_{eff}$ is chosen to be sufficiently higher than $F_{target}$ (for k or example from 1% to 10% higher) to take account of periods of transition between two phases of operation (in some cases the operation of the core 110 may be interrupted during these transition periods).

Figure 3:
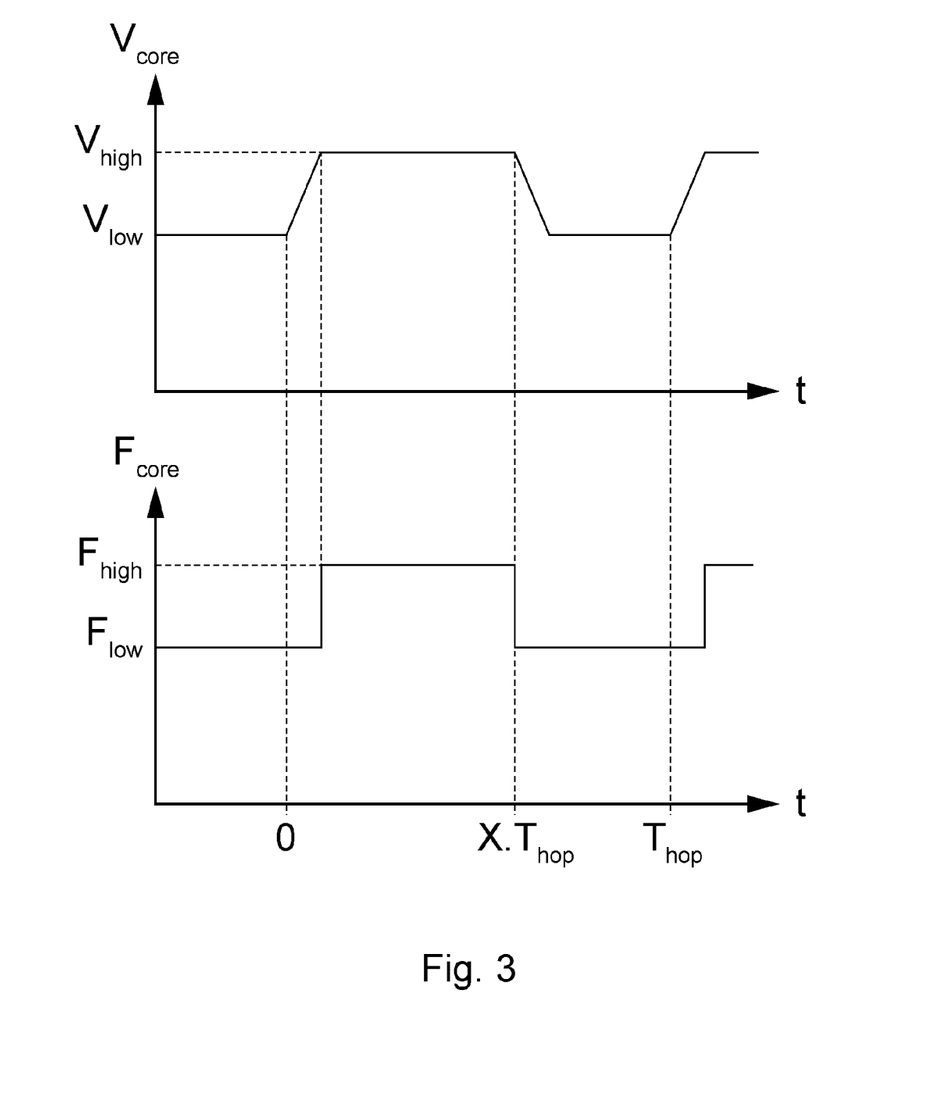
FIG. 3 illustrates the supply voltage and clock frequency variations present when using the FIG. 2 system.

The proportion X determined in this way is transmitted to the hop sequencer 124 that drives on the one hand the frequency selector 120 (by means of the command $hop_F$) to apply successively to the circuit 110 the two clocks $H_{high}$ and $H_{low}$ in order to obtain the time proportions just defined, as shown in FIG. 3, and on the other hand the voltage selector 114 (under the control of the signal $hop_V$) so that the latter applies the voltage $V_{high}$ to the core 110 simultaneously with the clock $H_{high}$ and the low voltage $V_{low}$ simultaneously with the clock $H_{low}$ (see also FIG. 3), which optimizes power consumption at all times.

FIG. 3 (in which $F_{core}$ denotes the frequency of the clock $H_{core}$ applied to the core 110 by the frequency selector 120) shows one example of possible operation obtained by means of the hop sequencer 124: in this example, the hop sequencer 124 operates with a period $T_{hop}$. At a time t=0, the sequencer 124 commands the selectors 114, 120 to go from a mode of operation at the voltage $V_{low}$ and at the frequency $F_{low}$ to a mode of operation at the voltage $V_{high}$ and at the frequency $F_{high}$, switching the voltage first by means of the selector 114 and then the frequency by means of the frequency selector 120.

At a time $t=X\cdot T_{hop}$, the sequencer 124 commands the selectors 114, 120 to go from the mode at voltage $V_{high}$ and frequency $F_{high}$ to the mode at voltage $V_{low}$ and frequency $F_{low}$, switching the frequency first and then the voltage.

Because of the periodic operation mentioned above, the hop sequencer effects at time $t=T_{hop}$ the same operation as at time t=0, and so on.

Clearly, by exception, the hop sequencer 124 commands the selectors 114, 120 to ensure constant operation at the voltage $V_{high}$ and the frequency $F_{high}$ if the proportion X has the value 100%, whereas it commands constant operation at the voltage $V_{low}$ and the frequency $F_{low}$ if the proportion X has the value 0.

The voltage selector 114 is for example of the type described in the paper "*A Power Supply Selector for Energy- and Area-Efficient Local Dynamic Voltage Scaling*", by S. Miermont et al., in the proceedings of PATMOS, September 2007. The frequency selector 120 is for example of the "glitch-free" type described in U.S. Pat. No. 6,501,304.

Such a voltage selector makes it possible, during a transition phase, to apply to the electronic circuit a voltage variable from a value equal to a first voltage ($V_{low}$ or $V_{high}$) to a value equal to the other voltage, and then to select application of the other voltage to the electronic circuit when the variable voltage has reached that other voltage, which enables continuous powering of the electronic circuit.

This voltage selector makes it possible to manage the inverse transition phases by applying the variable voltage to the electronic circuit when that other voltage is applied, removing the other voltage when the variable voltage is applied, and commanding the variable voltage to go from a value equal to this other voltage to a value equal to the first voltage.

The operation that has just been described thus makes possible powering of the core 110 at the mean effective frequency $F_{eff}$ referred to above, whilst optimizing at all times the voltage-frequency pair used, using only two voltage supplies. Note in this regard that the variable voltage the use of which is proposed in the example described above is used only during the brief transition phases and that recourse may therefore be had to a linear converter for the generation of this variable voltage without significant consequences as to the electrical efficiency (the voltage generated by the converter during operating phases to the voltage $V_{high}$ corresponding to the maximum voltage of the latter and therefore not involving resistive losses).

Figure 4:
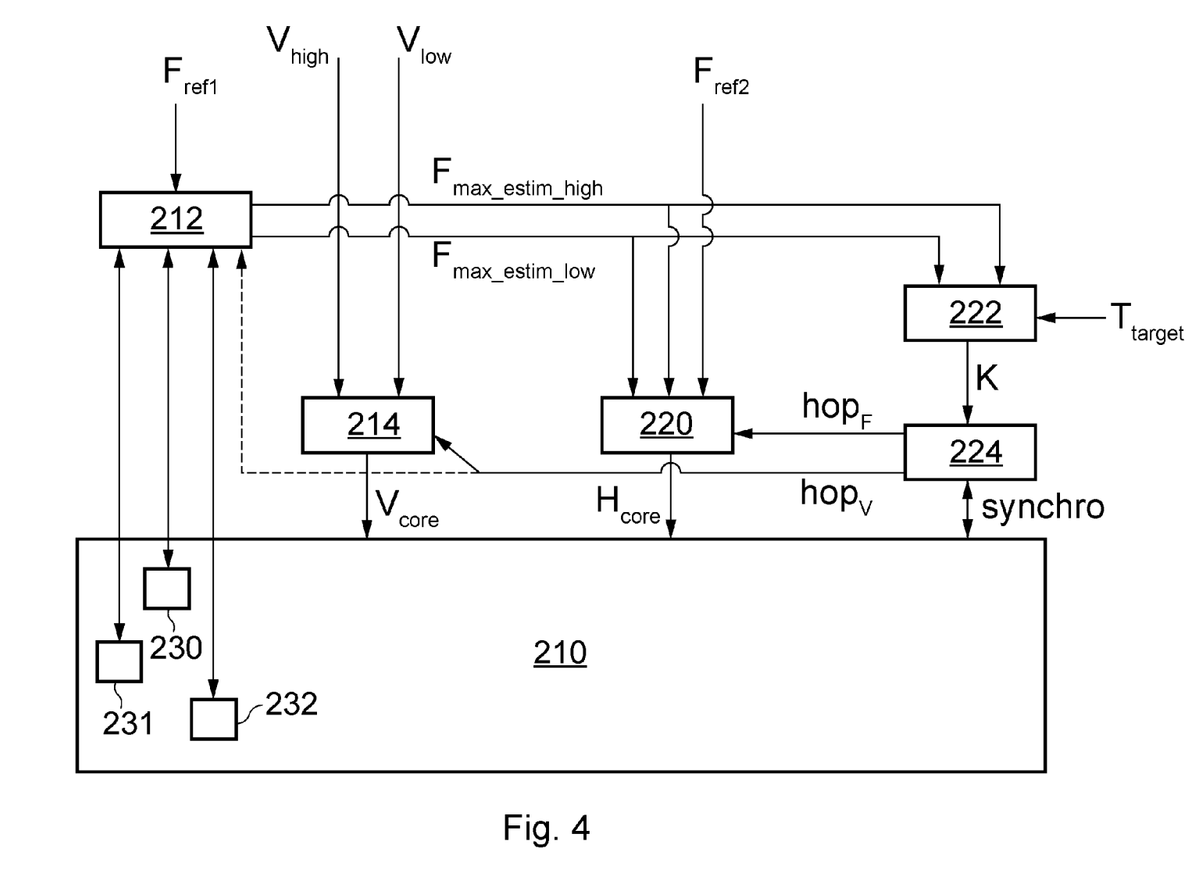
FIG. 4 represents a second example of application of the invention.

FIG. 4 represents an embodiment of the invention applied to the case where the functional core (referenced 210 here) is a block receiving input data periodically (i.e. every $T_{data}$) and then having a maximum time $T_{target}$ (sometimes referred to as the "block latency") available for processing this input data (this processing necessitating N clock cycles) and communicating the processed data to the next block.

In FIG. 4, components having a function corresponding to a component from FIG. 1 carry a reference number increased by 200 relative to that component in FIG. 1.

The probes 230, 231, 232 used in this embodiment are ring oscillators as described for example in the paper "*Product-Representative 'at Speed' Test Structures for CMOS Characterization*", by B. M. Ketchen et al., in IBM Journal of Research and Development, volume 50, No. 4/5, July 2005.

In practice an oscillator 230 with "long wire" connections, an oscillator 231 based on transistors with a high threshold voltage, and an oscillator 232 based on transistors with a low threshold voltage are used, for example. An oscillator with capacitive components could equally be used, for example.

An adaptation controller 212 regularly measures the frequency of each of the oscillators 230, 231, 232, notably using a reference frequency $F_{ref1}$. Operation of the core 210 is simulated at the design stage to determine the variations of its maximum operating frequency as a function in particular of supply voltage and temperature. The variations of the frequency of each of the oscillators referred to above as a function of the same parameters (supply voltage and temperature in particular) are also known, for example thanks to the same type of simulation, so that it is possible to determine the maximum usable frequencies $F_{max\_estim\_high}$ and $F_{max\_estim\_low}$ at the high voltage $V_{high}$ and the low voltage $V_{low}$, respectively, as a function of the different frequencies of the oscillators 230, 231, 232 (for example, using a simplified model, a weighted sum). Monte-Carlo type simulations may be used in this context, for example.

The operating frequencies $F_{max\_estim\_high}$ and $F_{max\_estim\_low}$ each associated with one of the fixed supply voltages $V_{high}$ and $V_{low}$ are transmitted on the one hand to a clock generator 220 (for example implemented by means of a phase-locked loop (PLL) receiving a reference signal $F_{ref2}$) and on the other hand a performance controller 222.

On the basis of this information $F_{max\_estim\_high}$ and $F_{max\_estim\_low}$ and information $T_{target}$ representing the latency of the block, the performance controller 222 determines the number of clock cycles in which the core 210 must operate at the high frequency $F_{max\_estim\_high}$ (among the N clock cycles necessary for processing the data as mentioned above), also taking account of the transition time $T_{transition}$ necessary to change from one mode of operation to the other, so that the processing time does not exceed the target time $T_{target}$. This amounts to saying that the performance controller 222 determines the number K that satisfies the equation:

$$T_{target} = \frac{K}{F_{max\_estim\_high}} + \frac{N-K}{F_{max\_estim\_low}} + T_{transition} \quad 5$$

The number K of operating cycles at the frequency $F_{max\_estim\_high}$ (and the voltage $V_{high}$) is communicated by the performance controller 222 to a hop sequencer 224 that commands the clock generator 220 by means of a signal $hop_F$, so that the generator 220 operates at the frequency $F_{max\_estim\_high}$ (received from the adaptation controller 212) during the first K clock cycles of the processing and at the frequency $F_{max\_estim\_low}$ (also received from the adaptation controller 212) during the next N-K cycles. To this end the operation of the hop sequencer 224 and that of the core 210 are synchronized, for example by exchanging synchronization information (denoted synchro in FIG. 4).

Figure 5:
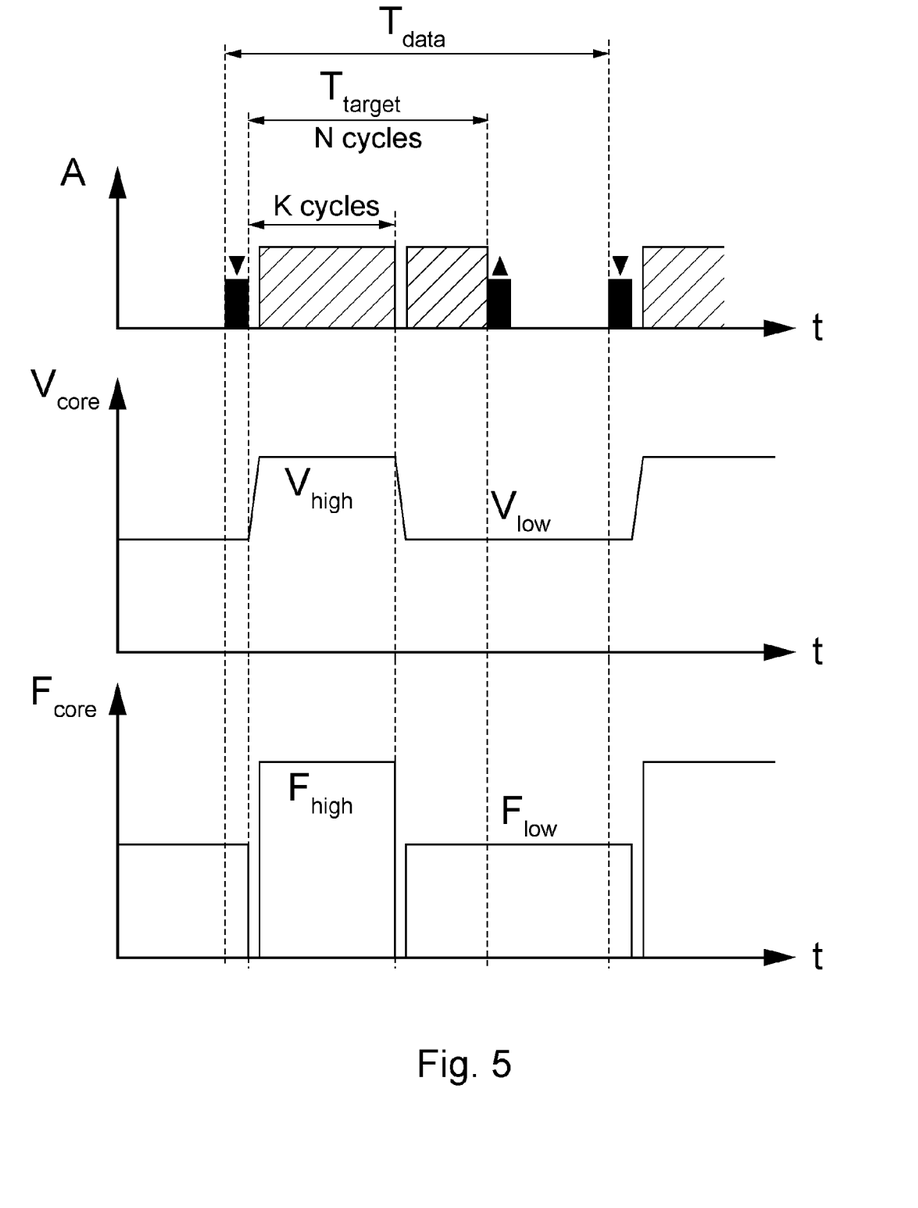
FIG. 5 shows timing diagrams illustrating the operation of the system from FIG. 4.

As mentioned above, a transition phase of duration $T_{transition}$ may be provided to take account of the time constant of the control loop of the generator 220; in this case the operation of the core 210 will be interrupted during this transition phase, for example, and the N clock cycles will thus be formed of K cycles before the transition period and N-K cycles after the transition period, as represented in FIG. 5.

The hop sequencer 224 also commands a voltage selector 214 to apply the high voltage $V_{high}$ during the first K clock cycles and the low voltage $V_{low}$ the rest of the time, and thus notably at the end of processing the data (N-K cycles) and during phases of waiting for the next data to be processed (latency time $T_{target}$ elapsed but reception time $T_{data}$ not elapsed), as seen clearly in FIG. 5 (in which A represents the activity of the core 210 and the transition time $T_{transition}$ is ignored).

The voltage selector 214 is for example of the type described in the paper "*VDD-Hopping Accelerator for On-Chip Power Supplies Achieving Nano-Second Order Transient Time*", by K. Onizuka et al., in proceedings of the ASSCC, November 2005, which in particular makes interruption of the block possible during the transition referred to above.

The foregoing embodiments are merely possible examples of implementation of the invention.

For example, although a temporal constraint is envisaged hereinabove (expressed in the form of a frequency for a latency time to be complied with), the constraint could therefore be of a different kind; for example, it could be a mean power consumption constraint (the duration of operation at the high frequency being limited so as to comply with this constraint).

The invention claimed is:

1. A device for powering an electronic circuit that applies at least a first voltage or a second voltage different from the first voltage to the electronic circuit, wherein the first voltage is lower than the second voltage, the device comprising:
an adaptation controller determining a first frequency associated with the first voltage as a function of at least one operating parameter of the electronic circuit;
a performance controller that receives information defining a constraint and determines a first duration and a second duration which are such that the operation of the electronic circuit at the first frequency for the first duration and at a second frequency associated with the second voltage for the second duration complies with the constraint, where the first frequency is lower than the second frequency; and
an application circuit including a voltage selector coupled to the first voltage source and the second voltage source, and a transition sequencer or a hop sequencer coupled to the performance controller, the application circuit sequentially applying to the electronic circuit the first voltage and the first frequency for the first duration and the second voltage and the second frequency for the second duration,
wherein the application circuit executes, at evenly spaced intervals, for each period of a plurality of periods, successively application of the first voltage and the first frequency, and application of the second voltage and the second frequency.

2. The powering device according to claim 1, wherein the adaptation controller further includes means for determining the second frequency as a function of at least one operating parameter of the electronic circuit.

3. The powering device according to claim 2 further comprising means for measuring the at least one operating parameter in the electronic circuit.

4. The powering device according to claim 1, wherein the information defining a constraint comprises a target frequency and the performance controller is adapted to determine the first duration and the second duration so that the electronic circuit operates at a mean effective frequency higher than the target frequency.

5. The powering device according to claim 1, wherein the performance controller further comprise means able to determine a ratio between the first duration and the second duration as a function at least of the first frequency.

6. The powering device according to claim 1, wherein the operating parameter comprises an instantaneous operating condition of the electronic circuit.

7. The powering device according to claim 6, wherein the adaptation controller further comprises means for determining the second frequency as a function of at least one instantaneous operating condition of the electronic circuit.

8. The powering device according to claim 7, wherein the performance controller further comprises means for determining a ratio between the first duration and the second duration as a function of the first frequency and the second frequency.

9. The powering device according to claim 1, wherein the application circuit further comprise a frequency selector receiving a first clock signal having the first frequency and a second clock signal having the second frequency and applying to the electronic circuit the first clock signal during the first duration and the second clock signal during the second duration.

10. The powering device according to claim 1, wherein the application circuit further comprise a clock generator that generates and applies a first clock having the first frequency to the electronic circuit during the first duration and a second clock having the second frequency during the second duration.

11. The powering device according to claim 1, wherein the voltage selector receives the first voltage and the second voltage and applies the first voltage ($V_{high}$) to the electronic circuit during the first duration and the second voltage ($V_{low}$) during the second duration.

12. The powering device according to claim 11, wherein the voltage selector comprises:
   means for applying to the electronic circuit a voltage variable from a value equal to the first voltage to a value equal to the second voltage; and
   means for selecting application of the second voltage to the electronic circuit when the variable voltage reaches the second voltage.

13. The powering device according to claim 12, wherein the voltage selector further comprises:
   means for applying the variable voltage to the electronic circuit when the second voltage is applied;
   means for removing the second voltage when the variable voltage is applied;
   means for commanding the variable voltage from a value equal to the second voltage to a value equal to the first voltage.

14. The powering device according to claim 1, wherein the constraint comprises a temporal constraint.

15. The powering device according to claim 1, wherein the electronic circuit comprises a digital circuit.

16. The powering device according to claim 1, wherein the electronic circuit comprises a circuit implemented in CMOS technology.

17. A method of powering an electronic circuit by means of at least a first voltage or a second voltage higher than the first voltage, the method comprising:
   determining a first frequency associated with the first voltage as a function of at least one operating parameter of the electronic circuit;
   receiving information defining a constraint;
   determining a first duration and a second duration, such that operation of the circuit at the first frequency during the first duration and at a second frequency associated with the second voltage during the second duration complies with the constraint, where the second frequency is higher than the first frequency;
   sequentially applying the first voltage and the first frequency to the circuit during the first duration and the second voltage and the second frequency during the second duration,
   wherein a period formed successively of the application of the first voltage and the first frequency, and application of the second voltage and the second frequency, is executed at evenly spaced intervals.

18. The powering method according to claim 17 further comprising:
   periodically measuring the operating parameter; and
   periodically determining the first frequency as a function of the measured parameter.

19. The powering method according to claim 18 further comprising periodically determining a ratio between the first duration and the second duration as a function of the first frequency determined as a function of the at least one operating parameter.

* * * * *